United States Patent Office 2,785,810
Patented Mar. 19, 1957

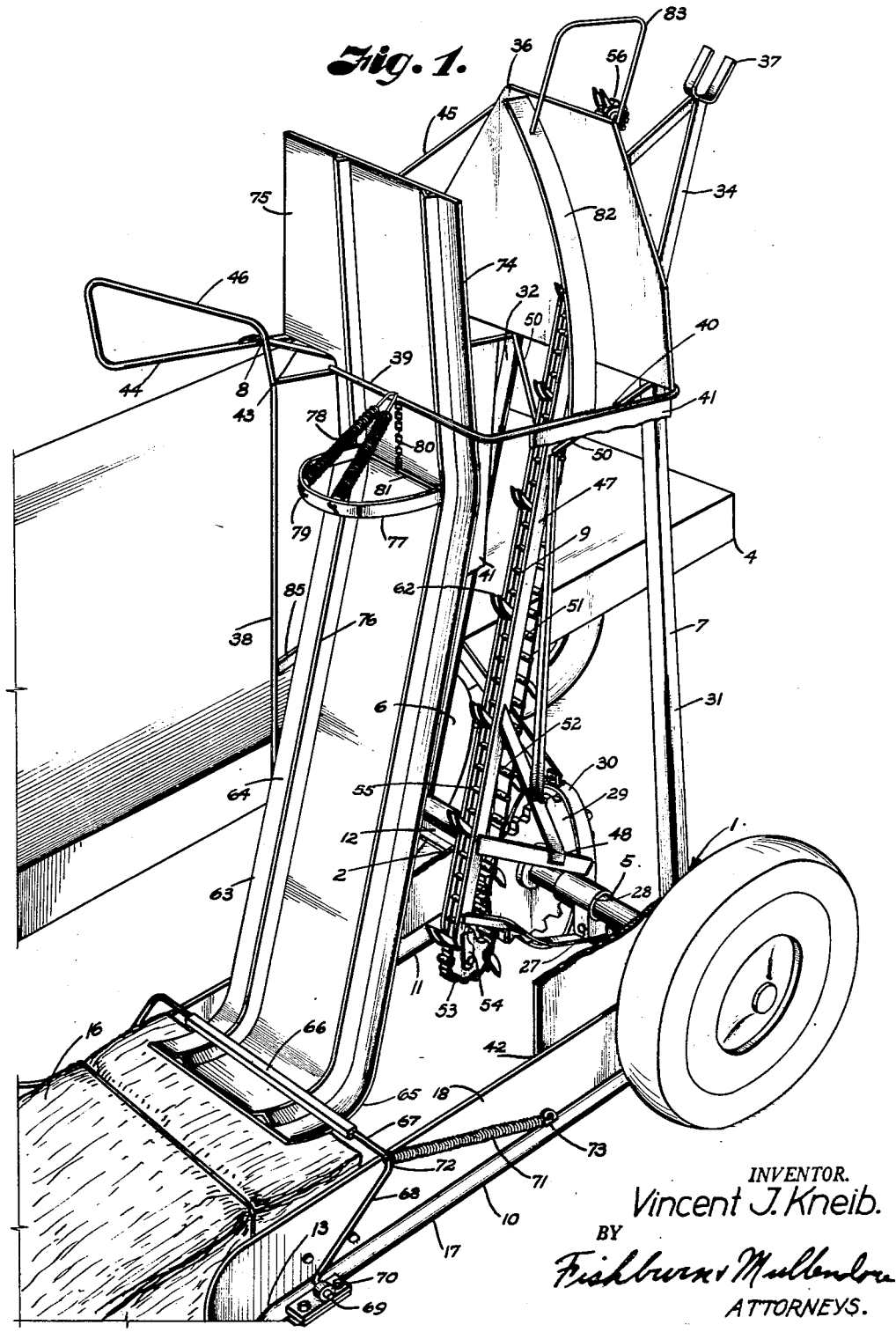

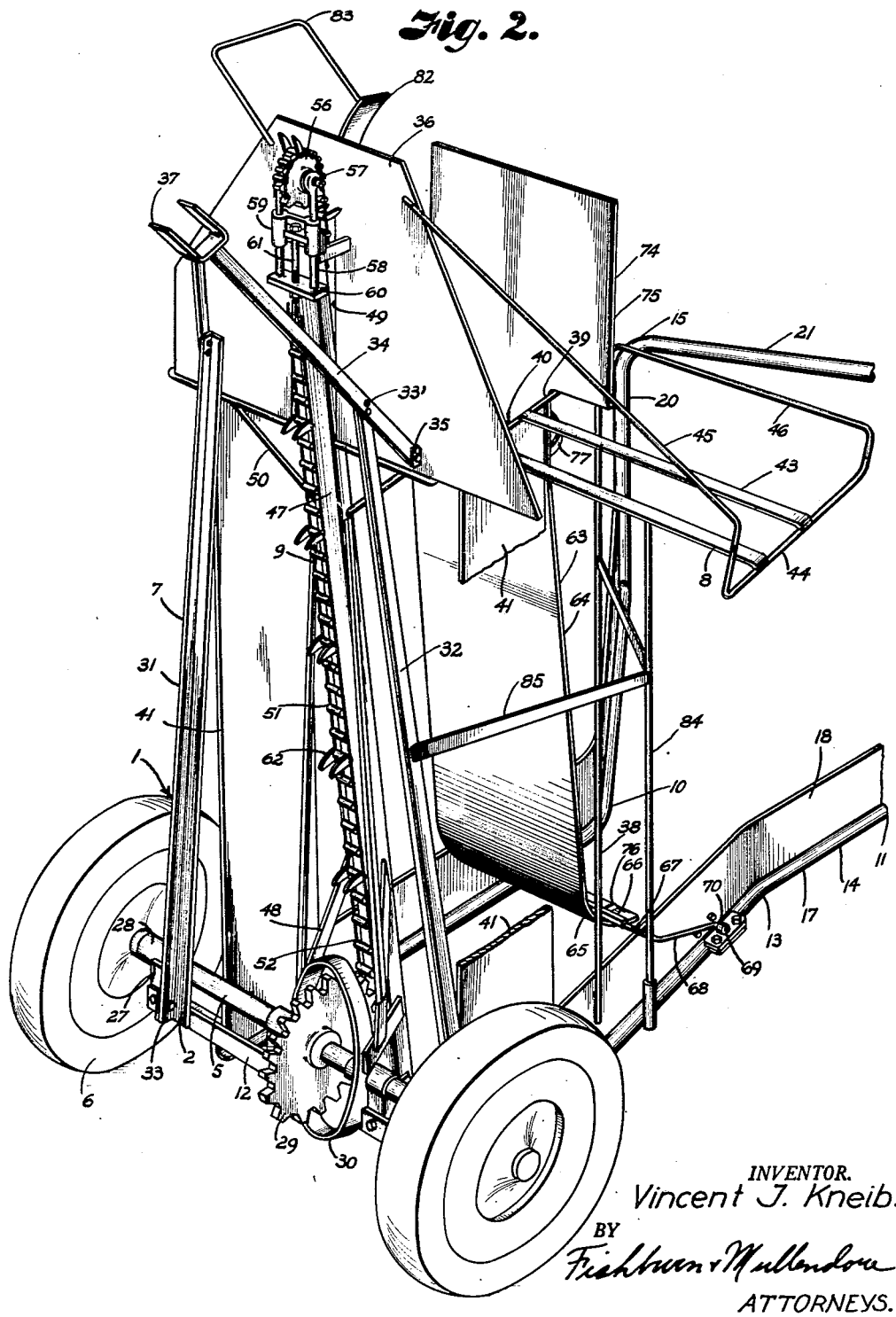

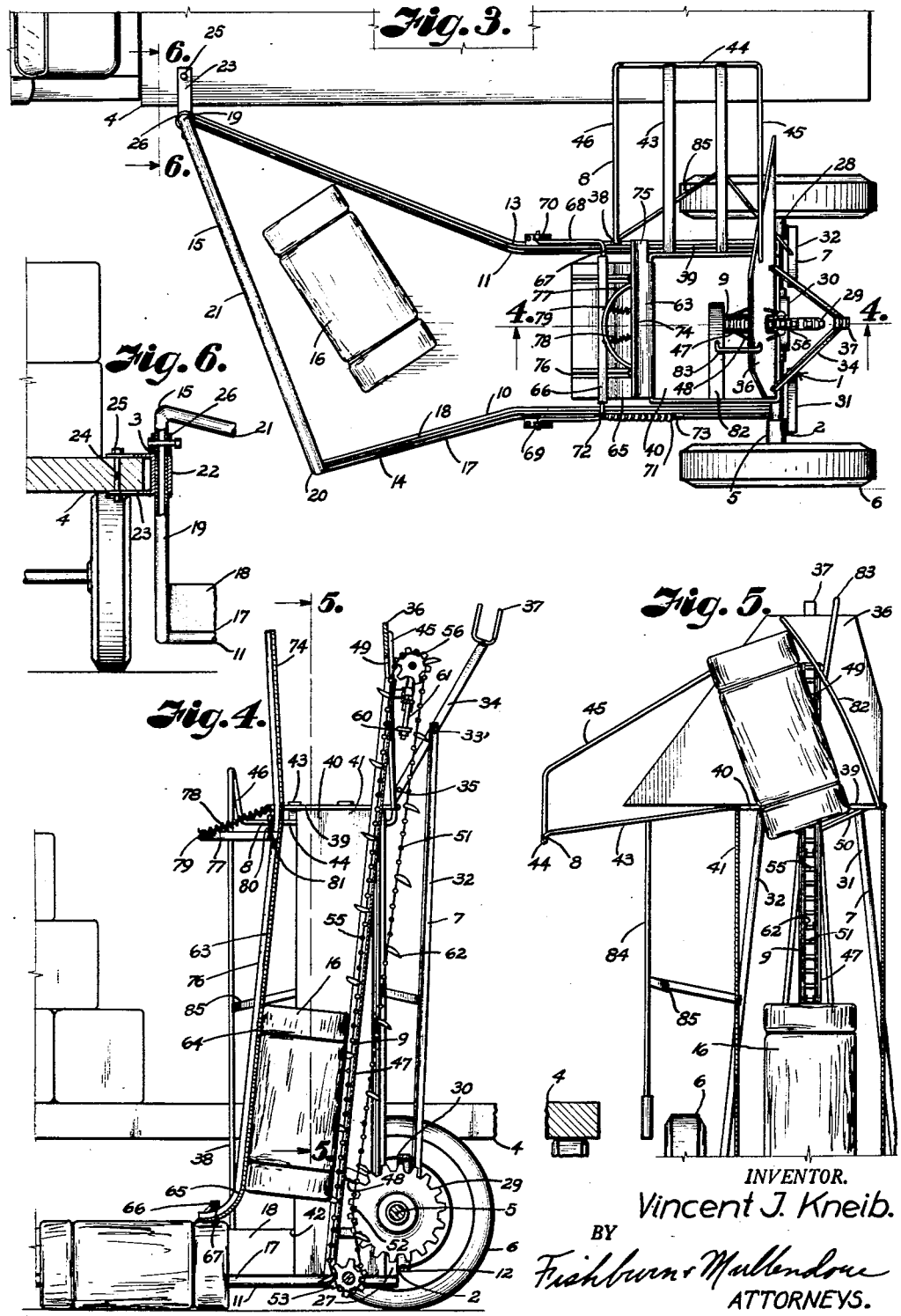

2,785,810

BALE LOADING MACHINE

Vincent J. Kneib, St. Joseph, Mo., assignor of one-half to Alphonse P. Kneib, St. Joseph, Mo.

Application May 18, 1955, Serial No. 509,238

7 Claims. (Cl. 214—42)

This invention relates to bale loading machines, and more particularly, to machines that are moved through a field to pick up and elevate the bales for loading on to a wagon or like carrier.

It is common practice to use what is termed "pick-up balers" that will pick up loose mowed hay and the like, move same into the baler where it is packed and tied, and the bale discharged therefrom on to the ground. Some machines produce round bales and others what are termed "square" bales, but in either instance, the bales discharged from the balers may lie in a haphazard row extending across a field. In the past, many and various types of mobile agricultural loading machines have been developed for loading bales on to wagons or the like, but such structures are usually large, expensive machines that become jammed when the bales are close together, and in some instances, the discharge of the bale on to the wagon provides a hazard to the operator.

The objects of the present invention are to provide a bale loading machine with a forward portion attached to the side of a wagon, truck or other vehicle, to move along the ground therewith and elevate successive bales to a position above the level of the wagon or truck bed; to provide such a loading machine with a wheel supported axle at the rearward portion thereof to supply driving power for an elevating conveyor; to provide such a loading machine with spaced rearwardly converging members for straightening and guiding bales into the elevating mechanism; to provide a bale loading machine with an elevating mechanism including a conveyor and resiliently mounted guide members for retaining the bale engaged with the elevating conveyor; to provide such a machine with a discharge platform at a level above the truck or wagon bed with cooperating means for moving the bales from the conveyor to said platform; and to provide a bale loading machine which is economical to manufacture, capable of trailing alongside of a truck or wagon to efficiently and positively pick up and elevate bales of hay and the like.

In accomplishing these and other objects of the present invention, I have provided improved details of structure, the preferred form of which is illustrated in the accompanying drawings, wherein:

Fig. 1 is a perspective view of the elevating portion of the bale loading mechanism alongside a wagon or the like.

Fig. 2 is a perspective view of the bale loading mechanism looking from the rear end wagonside thereof.

Fig. 3 is a plan view of the bale loading machine attached to a wagon or the like.

Fig. 4 is a vertical sectional view through the bale loading mechanism on the line 4—4, Fig. 3.

Fig. 5 is a transverse sectional view through the bale loading machine on the line 5—5, Fig. 4.

Fig. 6 is a transverse sectional view through the connection of the bale loading machine to the wagon or the like.

Referring more in detail to the drawings:

1 designates a mobile bale loading machine including a frame 2 having a connection 3 with a truck, wagon or the like 4. The rear portion of the frame is supported by an axle 5 having spaced ground-engaging wheels 6 thereon and adjacent the rearward portion of the frame is an upstanding standard or frame portion 7 carrying a discharge platform 8 at an elevation above the wagon bed. The frame and upstanding portion thereof carries an elevating conveyor 9 for picking up and elevating bales to be loaded on to the wagon 4.

The frame 2 includes a pair of opposed side rails 10 and 11 connected at their rear ends by a transverse member 12. The rearward portion of the side rails 10 and 11 are preferably substantially parallel and spaced a distance slightly greater than the width of a bale to be loaded, the parallel portions of the rails extending forwardly from the transverse member 12 and terminating as at 13 in diverging or flaring wing portions 14, with the forward end of said wings connected by an arch-like member 15 forming an opening of suitable width for receiving bales 16 in a haphazard row whereby the flaring portion of the wings tend to form guides directing the bales into the space between the parallel portions of the frame side rails 10 and 11. The flaring wings and side rails cooperate to define a path for the bales to the conveyor.

In the particular structure illustrated, and in keeping with light weight and ample rigidity, the side rails 10 and 11 include tubular metal members 17 with upstanding sheet metal members 18 secured throughout the length thereof to provide a suitable height to guide the bales resting on the ground into the elevating mechanism. Various forms of side rails may be utilized; however, it is preferable that smooth and rounded surfaces be presented for engagement with the bale for eliminating possibility of tearing of same. The forward ends of side rails 10 and 11 are suitably connected to the lower ends of spaced, vertical legs 19 and 20 of the arch member 15, the upper ends of said legs 19 and 20 being connected by a transverse upper member 21 of said arch member. The leg 19 is arranged to be adjacent the wagon or the like 4 and the connection 3 includes the sleeve 22 slidably mounted on the leg 19, said sleeve having vertically spaced ears 23 extending laterally therefrom to engage above and below a portion of the wagon bed, the ears 23 having suitable apertures therein adapted to align with an aperture 24 in the wagon bed for receiving suitable fastening devices 25 for securing the sleeve to the wagon bed. A collar 26 is adjustably mounted on the leg 19 above the sleeve 22 whereby the position of the collar regulates the spacing between the forward end of the side rail 11 from the ground; however, the connector is such that said side rail may be moved upwardly when passing over uneven ground but the minimum spacing is regulated so the forward end of the loading mechanism will not strike the ground.

The rear ends of the side rails 10 and 11 are connected to the transverse member 12 which has a plurality of spaced upstanding brackets 27 thereon carrying bearing members 28 which rotatably mount the axle 5. The wheels 6 each preferably have a conventional overrunning clutch connection with the axle 5 whereby when the wheels are turned during forward movement of the loading machine, they will turn the axle, but during rearward movement the axle will remain stationary. A sprocket 29 is fixed to the axle 5 substantially midway between the wheels 6 and is adapted to drive the elevating conveyor 9 as later described. The transverse member 12 includes a guard member in the form of a ring 30 which surrounds the sprocket 29. The upstanding frame portion or standard 7 includes spaced structural members 31 and 32 having their lower ends fastened as at 33 to the transverse member 12 and their upper ends are connected as at 33' to arms 34 which have ends connected as at 35 to an upstanding plate member 36 adjacent the upper portion of the upstanding frame portion or standards 7. The arms 34 converge rearwardly from the plate member 36 and have their rear ends connected to a clevis member 37 adapted to be connected to a hitch of a tractor or the like when the loading machine is to be moved from one location to another, during which movement the loading machine would be supported by the wheels 6 and the clevis member 37.

The frame portion or standards 7 also includes upstanding members 38 having the lower ends secured to the side rails 10 and 11 in spaced relation to the transverse member 12 with the upper ends thereof connected to horizontal members 39 arranged in a substantially open square slightly larger than the width or diameter of a bale to be loaded. The side members of said open square frame 40 are secured to the upper ends of flat sheet metal side wall member 41 which have their lower ends secured as at 42 to the side rails 10 and 11, said sheet metal forming side guides for the bale being elevated. The rear member of the square frame 40 is suitably secured to the lower edge of the plate member 36 which extends upwardly therefrom approximately the length of a bale. The side member of the square frame 40 adjacent to the wagon or the like has spaced strips 43 secured thereto and extending outwardly and downwardly therefrom with the outer ends secured to a bar 44 having its ends connected to brace rods 45 and 46 connected to the plate member 36 and the upright member 38 to form the discharge platform 8.

A channel shaped track 47 is arranged to provide an open trough having the opening thereof facing forwardly of the machine with the lower end of said channel member supported by arms 48 suitably connected to the guard member 30 and transverse member 12 whereby said lower end is spaced forwardly from the sprocket 29 and is substantially in the same plane as the sprocket. The upper portion of the channel member 47 slopes rearwardly and extends through a slot 49 in the plate 36, the upper portion of the channel track member 47 being secured to the frame 40 and plate member 36 and is suitably braced as by brace members 50 to provide a rigid structure. An endless chain 51 has its rearward run 52 engaging the teeth at the forward portion of the sprocket 29 and then extends around a sprocket 53 rotatably mounted on bearing members 54 whereby the chain operates under the sprocket 53 and the forward run 55 is guided upwardly in the trough of the channel member 47. The chain operates over a sprocket 56 rotatably mounted in bearings 57 adjustably supported on the upper end of the channel member 47, the bearings 57 being arranged on supports 58 slidably mounted in guides 59 and connected to a bar 60 with a screw 61 arranged between the bar 60 and the guides 59 for moving said supports 58 to tighten the chain. Spaced teeth 62 are mounted on the chain and adapted to extend into bales and take a bite on same to elevate the bale in the machine.

A bale press and guide member 63 is carried on the frame in forwardly spaced relation to the conveyor chain 51 and serves to resiliently press the bales in contact with the teeth 62 during their movement toward the platform 8. The guide press member is preferably formed of sheet metal and has an elongated portion 64 of a width less than the width of the bale which terminates in its lower end in a forwardly curved portion 65 normally spaced from the ground a distance slightly greater than the vertical thickness of the bale. The curved lower end 65 is secured to a bearing member 66 rotatably mounted on a shaft 67 extending transversely of and above the side rails 10 and 11. The shaft 67 terminates in arms 68 which extend forwardly and downwardly and terminates in trunnions 69 rotatably mounted in bearings 70 carried by the respective side rails. A spring 71 has one end secured as at 72 to the shaft 67 and the other end secured as at 73 to the side rail 10 to swing the shaft 67 rearwardly toward the chain 51. The elongated portion 64 extends upwardly and rearwardly substantially parallel to the channel member 47 to a line spaced below the frame 40 and terminates in a substantially vertical portion 74 that extends above the frame 40 approximately to the height of the plate 36 which is approximately a distance above the frame 40 corresponding substantially to the length of the bale. The upper portion of the sheet 64 has a lateral extension 75 extending partially over the platform 8 to cooperate with the plate 36 to guide the bale on to the platform 8. The presser guide 63 preferably has longitudinal ribs 76 to stiffen same. A bar 77 is arranged substantially in a U-form with its ends connected to the ribs 76 adjacent the intersection of the portions 64 and 74 whereby the bar extends forwardly therefrom. Springs 78 have ends connected as at 79 to the central portion of the bar member 77 and their other ends connected to a flexible member 80 which extends over the forward member of the frame 40 and is connected to a rod 81 extending between the ends of the bar 77 whereby the spring tension of the springs 78 is adjustable to support the upper portion of the presser guide and urge same toward the conveyor to resiliently urge the bale into engagement with said conveyor. A resilient strip 82 has its lower end secured to the side of the frame 40 remote from the platform 8 and curves upwardly and toward the platform side and is connected adjacent its upward end to a bar member 83 that is connected to the plate 36 whereby the member 82 engages the bale during its upward travel above the frame 40 and tilts same on to the platform 8. A bar 84 has its upper end connected to the platform 8 and extends downwardly therefrom and is supported by braces 85 whereby the lower end of said bar is spaced laterally of the wheel 6 adjacent to the wagon to maintain the spacing therebetween.

In operating a bale loading machine constructed as described, the clevis 37 is connected to a hitch of a tractor or the like and the machine is moved to the field where it is desired to load bales. Then the clevis 37 is disconnected from the tractor and the connector 3 connected to a wagon or truck, and the collar 26 adjusted on the leg 19 whereby the side rail 11 is substantially parallel to the ground. Then the wagon or truck is moved alongside of a row of bales to be picked up and loaded whereby said row of bales can enter between the legs 19 and 20 of the arch member 15. As the bales enter and contact the side rails 10 and 11, the bales are straightened and guided between the parallel portions thereof and under the curved portion 65 of the presser guide 63. As the machine progresses forwardly, the wheels 6 turn the axle 5 which rotates the sprocket 29 driving the rear run 52 of the chain 51 downwardly and the forward run 55 of the chain upwardly in the channel member 47. When the teeth 62 on the conveyor chain engage the rear portion of a bale, they extend into said bale and pick same upwardly to move same between the conveyor chain and the presser guide 63, and during such upward movement, additional teeth 62 enter and engage the bale. During the upward movement, the springs 71 and 78 urge the presser guide 63 against the bale holding same in engagement with the conveyor chain and teeth 62 thereon. As the bale reaches the uppermost portion of its travel, the upper end of the bale engages the member 82 which tilts the bale onto the platform 8 where a man on the truck can reach same with a bale hook and pull it off on to the wagon bed to load as desired. If the bales are close together, the forward bale is held back until the first bale is moved upwardly on the conveyor and then the next bale is engaged by the conveyor and also elevated. If the operator has failed to remove a bale from the platform 8, the next bale will push the first bale off of the platform on to the bed of the wagon. Due to the connection between the machine and the wagon, the machine will trail alongside of the wagon and the bar member 84 will maintain the minimum spacing therebetween. In turning the wagon, however, as to the left with the structure illustrated, the machine can swing away from the wagon and thereby prevent any interference with the operation. In passing over rough terrain, the leg 19 of the arch member 15 can slide upwardly in the sleeve 22 but its downward movement is limited by the collar 26 whereby the forward end will not engage the ground.

It is believed obvious I have provided a bale loading machine that is economical to manufacture, easily operated and efficient in loading bales with little danger of jamming or other improper operation, and in which the bale is guided and protected whereby there is little possibility of the bale being damaged.

What I claim and desire to secure by Letters Patent is:

1. A bale loading machine comprising, a mobile frame, an endless conveyor on the frame for elevating and delivering bales in an inclined plane from a position on the ground to a delivery position adjacent the top of the loader, said endless conveyor having a plurality of spaced tooth members for engaging a bale and holding same during elevation thereof, means cooperating with the conveyor for defining an inclined chute through which the bales are moved during elevation thereof, a delivery platform on the mobile frame and extending laterally therefrom adjacent the upper end of said chute, guide means alongside of the upper portion of the conveyor above the platform and having an upper portion forwardly of said upper portion of the endless conveyor for engaging a bale being elevated to disengage same from the tooth members of the endless conveyor, and means on the frame at the opposite side thereof to the platform and inclined upwardly and toward the platform side for engaging the upper end of a bale being elevated above the platform for tilting the bale laterally of the frame and onto the platform.

2. A bale loading machine comprising, a mobile frame, an endless conveyor on the frame for elevating and delivering bales in an inclined plane from a position on the ground to a delivery position adjacent the top of the loader, said endless conveyor having a plurality of spaced tooth members for engaging a bale and holding same during elevation thereof, a presser guide strip spaced forwardly of the endless conveyor and having a portion substantially parallel thereto, means supporting the presser guide strip for movement toward and away from the endless conveyor, means having connection with the presser guide strip and frame for urging said strip toward the endless conveyor for retaining a bale being elevated in engagement with the conveyor tooth members, spaced side walls on the frame for cooperating with the endless conveyor and the presser guide strip for defining an inclined chute through which the bales are moved during elevation thereof, means driving the endless conveyor for elevating bales through said chute, a bale receiving platform extending laterally of the frame adjacent the upper end of the chute, said frame having an open side above and adjacent the platform, guide means on the frame at the rear of the chute above the platform and forwardly of the upper end portion of the endless conveyor whereby engagement of a bale being elevated with said guide means disengages said bale from the conveyor tooth members, and means on the frame at the opposite side of the upper end of the chute to the platform and inclined upwardly and toward the platform side for engaging the upper end of a bale being elevated above the platform for tilting the bale laterally of the frame and onto the platform.

3. A bale loading machine comprising, a mobile frame, an endless conveyor on the frame for elevating and delivering bales in an inclined plane from a position on the ground to a delivery position adjacent the top of the loader, said endless conveyor having a plurality of spaced bale engaging tooth members thereon, a presser guide strip spaced forwardly of the endless conveyor and having a portion substantially parallel thereto, means supporting the presser guide strip for swinging movement toward and away from the endless conveyor, resilient means having connection with the presser guide strip and frame for urging said strip toward the endless conveyor for retaining a bale being elevated in engagement with the conveyor tooth members, spaced side walls on the frame for cooperating with the endless conveyor and the presser guide strip for defining an inclined chute through which the bales are moved during elevation thereof, means driving the endless conveyor for elevating bales through said chute, a bale receiving platform extending laterally of the frame adjacent the upper end of the chute, said frame having an open side above and adjacent the platform, a substantially vertical extension on the presser guide strip extending above the platform, guide means on the frame at the rear of the chute above the platform and forwardly of the upper end portion of the endless conveyor whereby engagement of a bale being elevated with said guide means disengages said bale from the conveyor tooth members, and a strip on the frame at the opposite side of the upper end of the chute to the platform and curving upwardly and toward the platform side for engaging the upper end of a bale being elevated above the platform for tilting the bale onto the platform.

4. A bale loading machine comprising, a mobile frame, an endless conveyor on the frame for elevating and delivering bales in an inclined plane from a position on the ground to a delivery position adjacent the top of the loader, said endless conveyor having forward and rearward runs in a central vertical plane substantially longitudinally of the direction of travel of the machine, said endless conveyor having a plurality of spaced bale engaging tooth members thereon, a presser guide strip spaced forwardly of the forward run of the endless conveyor and having a portion substantially parallel thereto, means supporting the presser guide strip for swinging movement toward and away from the endless conveyor, resilient means having connection with the presser guide strip and frame for urging said strip toward the endless conveyor for retaining a bale being elevated in engagement with the conveyor tooth members, spaced side walls on the frame for cooperating with the endless conveyor and the presser guide strip for defining an inclined chute through which the bales are moved during elevation thereof, means driving the endless conveyor for elevating bales through said chute, a bale receiving platform extending laterally of the frame adjacent the upper end of the chute, said frame having an open side above and adjacent the platform, a substantially vertical extension on the presser guide strip extending above the platform, a substantially vertical rear wall on the frame at the rear of the chute above the platform and forwardly of the upper end portion of the endless conveyor whereby engagement of a bale being elevated with said rear wall disengages said bale from the conveyor tooth members, and a resilient strip on the frame at the opposite side of the upper end of the chute to the platform and curving upwardly and toward the platform side for engaging the upper end of a bale being elevated above the platform for tilting the bale onto the platform.

5. A bale loading machine comprising, a mobile frame having forwardly extending laterally spaced side rails with outwardly flared forward portions defining an entrance path for bales, said frame having upstanding portions adjacent the rear thereof, means connecting the forward end of one of the side rails to one side of a vehicle upon which the bales are to be loaded, said connecting means being adapted to advance the mobile frame in unison with the vehicle, an endless conveyor on the frame for elevating and delivering bales in an inclined plane from a position on the ground to a delivery position adjacent the top of the loader, said endless conveyor having a plurality of spaced teeth extending therefrom, said endless conveyor having forward and rearward runs substantially in a central vertical plane that is longitudinally of the direction in which the frame is moved, a transverse axle rotatably mounted on the frame rearwardly of the lower portion of said conveyor, ground-engaging wheels on the axle and operatively connected therewith for rotating same as the frame is moved forwardly, a sprocket on the axle engaging the rearward run of the endless conveyor for driving same whereby the forward run moves upwardly in elevating bales, a presser guide strip spaced forwardly of the forward run of the endless conveyor and having a portion substantially parallel thereto, means supporting the presser guide strip for swinging movement toward and away from the endless conveyor, resilient means having connection with the presser guide strip and frame for urging said strip toward the endless conveyor for retaining a bale being elevated in engagement with the conveyor teeth, spaced side walls on the frame for cooperating with the endless conveyor and the presser guide strip for defining an inclined chute through which the bales are moved during elevation thereof, a bale receiving platform extending laterally of the frame adjacent the upper end of the chute, said frame having an open side above and adjacent the platform, and means on the frame at the upper end of the chute for engaging the upper end of a bale being elevated above the platform for disengaging the bale from the conveyor teeth and tilting the bale laterally of the frame and onto the platform.

6. A bale loading machine comprising, a mobile frame having forwardly extending laterally spaced side rails with outwardly flared forward portions defining an entrance path for bales, said frame having upstanding portions adjacent the rear thereof, means connecting the forward end of one of the side rails to one side of a vehicle upon which the bales are to be loaded, said connecting means being adapted to advance the mobile frame in unison with the vehicle, an endless conveyor on the frame for elevating and delivering bales in an inclined plane from a position on the ground to a delivery position adjacent the top of the loader, said endless conveyor having a plurality of spaced teeth extending therefrom, said endless conveyor having forward and rearward runs substantially in a central vertical plane that is longitudinally of the direction in which the frame is moved, a transverse axle rotatably mounted on the frame rearwardly of the lower portion of said conveyor, ground-engaging wheels on the axle and operatively connected therewith for rotating same as the frame is moved forwardly, a sprocket on the axle engaging the rearward run of the endless conveyor for driving same whereby the forward run moves upwardly in elevating bales, a presser guide strip spaced forwardly of the forward run of the endless conveyor and having a portion substantially parallel thereto, means supporting the presser guide strip for swinging movement toward and away from the endless conveyor, resilient means having connection with the presser guide strip and frame for urging said strip toward the endless conveyor for retaining a bale being elevated in engagement with the conveyor teeth, spaced side walls on the frame for cooperating with the endless conveyor and the presser guide strip for defining an inclined chute through which the bales are moved during elevation thereof, a bale receiving platform extending laterally of the frame adjacent the upper end of the chute, said frame having an open side above and adjacent the platform, a substantially vertical extension on the presser guide strip extending above the platform, a substantially vertical rear wall on the frame at the rear of the chute above the platform and forwardly of the upper end portion of the endless conveyor whereby engagement of a bale being elevated with said rear wall disengages said bale from the conveyor teeth, and a resilient strip on the frame at the opposite side of the upper end of the chute to the platform and curving upwardly and toward the platform side for engaging the upper end of a bale being elevated above the platform for tilting the bale laterally of the frame and onto the platform.

7. A bale loading machine comprising, a mobile frame having forwardly extending laterally spaced side rails with outwardly flared forward portions defining an entrance path for bales, said frame having upstanding portions adjacent the rear thereof, means pivotally connecting the forward end of one of the side rails to one side of a vehicle upon which the bales are to be loaded, means associated with the pivotal connecting means for limiting downward movement only of the side rail relative to the vehicle, an endless conveyor on the frame for elevating and delivering bales in an inclined plane from a position on the ground to a delivery position adjacent the top of the loader, said endless conveyor having a plurality of spaced teeth extending therefrom, said endless conveyor having forward and rearward runs substantially in a central vertical plane that is longitudinally of the direction in which the frame is moved, a transverse axle rotatably mounted on the frame rearwardly of the lower portion of said conveyor, ground-engaging wheels on the axle and operatively connected therewith for rotating same as the frame is moved forwardly, a sprocket on the axle engaging the rearward run of the endless conveyor for driving same whereby the forward run moves upwardly in elevating bales, means on the frame for cooperating with the endless conveyor for defining an inclined chute through which the bales are moved during elevation thereof, a bale receiving platform extending laterally of the frame adjacent the upper end of the chute, a substantially vertical extension on the forward portion of the chute defining means extending above the platform, a substantially vertical rear wall on the frame at the rear of the chute above the platform and forwardly of the upper end portion of the endless conveyor whereby engagement of a bale being elevated with said rear wall disengages said bale from the conveyor teeth, and means on the frame at the upper end of the chute for engaging the upper end of a bale being elevated above the platform for tilting the bale onto the platform.

References Cited in the file of this patent

UNITED STATES PATENTS

| | | |
|---|---|---|
| 1,853,253 | Bennett | Apr. 12, 1932 |
| 2,367,970 | Smoker | Jan. 23, 1945 |

FOREIGN PATENTS

| | | |
|---|---|---|
| 152,376 | Australia | July 16, 1953 |